J. W. HEID.
FEED WATER TANK.
APPLICATION FILED APR. 21, 1914.
1,162,356.
Patented Nov. 30, 1915.
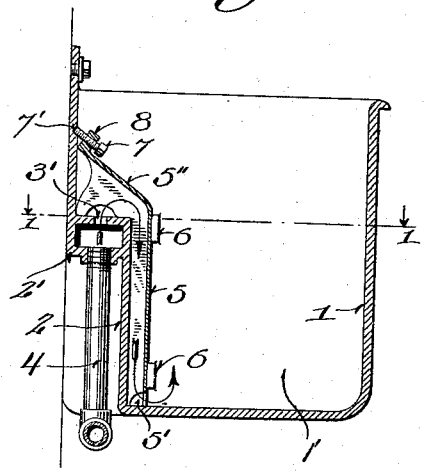
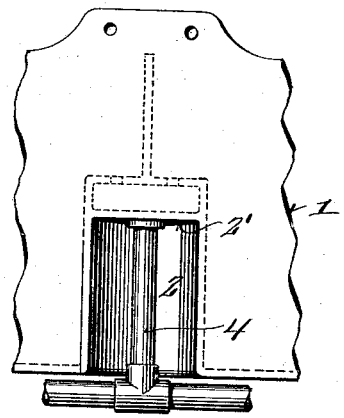
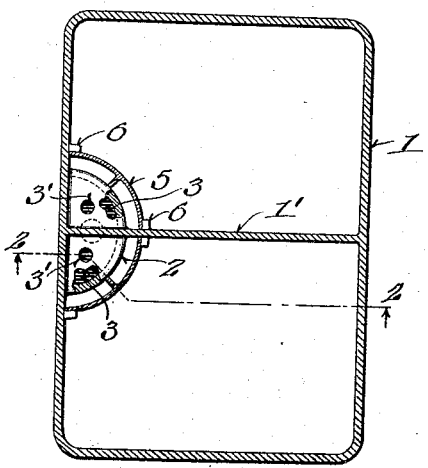
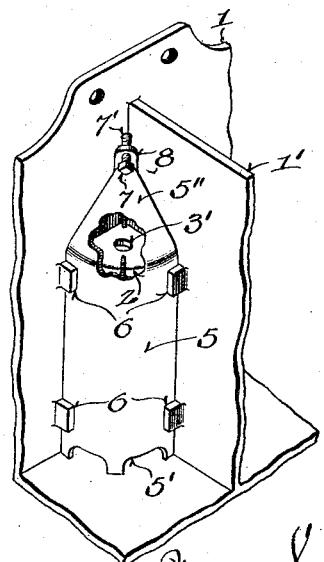

UNITED STATES PATENT OFFICE.

JOHN W. HEID, OF JEFFERSON, WISCONSIN.

FEED-WATER TANK.

1,162,356.     Specification of Letters Patent.     Patented Nov. 30, 1915.

Application filed April 21, 1914. Serial No. 833,418.

*To all whom it may concern:*

Be it known that I, JOHN W. HEID, a citizen of the United States, and resident of Jefferson, in the county of Jefferson and State of Wisconsin, have invented certain new and useful Improvements in Feed-Water Tanks; and I do hereby declare that the following is a full, clear, and exact description thereof.

My invention refers to feed-water tanks especially adapted for use in connection with cow-barns and its object is to provide a simple, economical and effective tank of the above character arranged in such manner that the water supply is delivered from a point a predetermined distance from the bottom of the tank and exteriorly thereof, having means for incasing the delivery mouth, whereby the same is protected from being choked by straw or other foreign matter deposited in the water incidental to its use.

So far as I am aware, heretofore tanks of this character having ordinary means of supplying water thereto are frequently choked at the point of supply and thus the feed is stopped, while at the same time the water is more or less contaminated by the foreign matter that becomes clogged about the point of water delivery. My invention, therefore, is designed to overcome the above objectionable features.

With the above objects in view the invention consists in certain peculiarities of construction and combination of parts as hereinafter set forth with reference to the accompanying drawings and subsequently claimed.

In the drawings Figure 1 represents a plan view of a double tank embodying the features of my invention; Fig. 2, a cross-section of the same, the section being indicated by line 2—2 of Fig. 1; Fig. 3, a detail fragmentary face view looking at the back of the tank, and Fig. 4, a perspective view of a portion of the tank showing one of the flow channels incased.

Referring by characters to the drawings, 1 represents a tank provided with a central portion 1', whereby the same is separated into compartments. In the juxtaposed corners of the compartments, midway of the length of the tank, the same is provided with an inwardly projecting throat 2 that extends from the bottom to a point slightly below the upper edge of the tank, as shown, at which point the throat terminates with an abrupt wall 2' having formed thereover a ported receiving cavity 3, it being understood that there is a port 3' arranged upon each side of the partition 1'. A branch connection 4 of a water-pipe is arranged to communicate with the receiving cavity 3, as shown, and the throat as a whole is incased by guard-shields 5, 5, which guard-shields are centrally ribbed and envelop the entire throat, being provided with uppercut bottom portions 5', which constitute discharge mouths for the water. The upper portion 5'' of each shield forms a practically air-tight cover for its companion discharge port 3'. Each shield is held in position by sets of retaining lugs 6, whereby the shield is guided when forced downward to its seat and, after so seated, the shields are each detachably confined by the set-screws 7, which set-screws are in threaded union with ears 8 that extend from the cap portions 5'' of the shields, the said set-screws being adapted to impinge within notched recesses 7' that are formed in the adjacent wall of the tank. By this construction, when the set-screw is turned in one direction, the shield is forced solidly down and held rigid to protect the point of delivering water from straw or other foreign matter which may be deposited within the tank.

By this method it is apparent that the water in being fed to the tank will first be discharged at approximately the water level and is thereafter caused to travel downwardly in the channel formed between the throat 2 and shell 5 and from thence it is discharged at the bottom of the tank through the mouth 5'.

It is obvious from the foregoing description that the point of supplying the water to the tank cannot be clogged as any foreign material is trapped by the shell 5 which protects the point of discharge.

It is also obvious that, while I have shown a double compartment tank, I may without departing from the spirit of my invention, use a single tank with a point of delivery in its corner or such point of delivery may be intermediate of the ends of the tank.

It is also within the scope of my invention to attach the guard shield in any suitable manner within the knowledge of skilled mechanics as may be found desirable.

I claim:

1. A feed-water device comprising a trough having an inwardly projecting throat that extends from the bottom of said trough and terminates with a receiving cavity, the said cavity having spaced intake ports in its upper wall communicating with the trough, a pipe in communication with the bottom wall of said cavity, a partition wall carried by the trough and located between the intake ports whereby said trough is divided into sections, and guard shells attachable to the cavity carrying wall of said trough and partition wall thereof for incasing the intake cavity ports.

2. A feed trough provided with a water-receiving cavity having an intake port, the cavity being located in a corner of the trough, a guard shell incasing the receiving cavity about the intake port and adapted to extend to the bottom of said trough, means extending from the walls of the trough for sliding engagement with the guard shell, and an obliquely disposed set screw carried by the guard shell adapted to engage a wall of the trough to force the guard shell downwardly in its incasing position.

In testimony that I claim the foregoing I have hereunto set my hand at Jefferson in the county of Jefferson and State of Wisconsin in the presence of two witnesses.

JOHN W. HEID.

Witnesses:
JOHN A. FEMHOLTZ,
J. WM. HEID.

Copies of this patent may be obtained for five cents each, by addressing the "Commissioner of Patents Washington, D. C."